(12) United States Patent
Chen

(10) Patent No.: US 7,899,503 B2
(45) Date of Patent: Mar. 1, 2011

(54) MOBILE PHONE WITH ROTATABLE CONNECTING APPARATUS

(75) Inventor: Ping-Chou Chen, Tainan Hsien (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 727 days.

(21) Appl. No.: 11/933,994

(22) Filed: Nov. 1, 2007

(65) Prior Publication Data
US 2008/0287168 A1 Nov. 20, 2008

(30) Foreign Application Priority Data

May 18, 2007 (CN) .......................... 2007 1 0074368

(51) Int. Cl.
*H04M 1/00* (2006.01)

(52) U.S. Cl. ................. 455/575.1; 455/550.1; 455/575.4

(58) Field of Classification Search ............... 455/575.1, 455/575.4, 575.8, 550.1, 90.3; 379/433.11, 379/433; 361/679.3, 679.56
See application file for complete search history.

(56) References Cited

U.S. PATENT DOCUMENTS

| 6,477,040 | B2 * | 11/2002 | Horiki ..................... 361/679.3 |
| 7,200,429 | B2 * | 4/2007 | Park et al. ................. 455/575.4 |
| 7,283,852 | B2 * | 10/2007 | Fagerstrom et al. ....... 455/575.1 |
| 7,492,893 | B2 * | 2/2009 | Ahn et al. ................ 379/433.13 |
| 2004/0192398 | A1 * | 9/2004 | Zhu .............................. 455/566 |
| 2010/0197371 | A1 * | 8/2010 | Hsu ............................ 455/575.4 |

FOREIGN PATENT DOCUMENTS

| CN | 1337812 A | 2/2002 |
| CN | 1894860 A | 1/2007 |

* cited by examiner

*Primary Examiner* — Sonny Trinh
(74) *Attorney, Agent, or Firm* — Jeffrey T. Knapp

(57) ABSTRACT

A mobile phone (100) includes a base (10), a cover (20) and a connecting apparatus (30). The cover is rotatably mounted on the base. The connecting apparatus connects the cover to the base. Either of the base and the cover defines a leading pole (24) and another of them defines a leading groove (14) corresponding to the leading pole. The leading pole slides in the leading groove and is selectively retained in at least two places.

14 Claims, 6 Drawing Sheets

MOBILE PHONE WITH ROTATABLE CONNECTING APPARATUS

BACKGROUND OF THE INVENTION

1. Field of the Invention

The present invention generally relates to mobile phones, and, particularly, to a mobile phone with a rotatable connecting apparatus.

2. Description of Related Art

With the recent development of the technology of information processing, mobile phones are widely used. Nowadays, besides typical function of communication, many mobile phones can also be used to play games.

Typical mobile phones mainly include bar mobile phones, folding mobile phones and sliding mobile phones. Generally, each of these typical mobile phones has a display and a keypad. For a bar type of mobile phone, the display and the keypad are respectively mounted on two opposite ends of the mobile phone. In a folding mobile phone or in a sliding mobile phone, the display and keypad are respectively disposed in a first housing and a second housing. During use, the first housing and the second housing are rotated/slid to opposite ends of a relative axis of the mobile phone such that the keypad and the display are exposed on a same side (facing the same direction). Thus, it is easy for the user to look at the display and operate the mobile phone at the same time.

However, playing games generally requires operating keypads with two hands. In the aforementioned typical mobile phones, their keypads are usually too narrow to be operated with two hands because of limitation of the width of the typical mobile phones. Therefore, the typical mobile phones are not suitable for playing games.

Therefore, a new mobile phone having a function of playing games is desired in order to overcome the above-described shortcomings.

SUMMARY

A mobile phone includes a base, a cover and a connecting apparatus. The cover is rotatably mounted on the base. The connecting apparatus connects the cover to the base. Either of the base and the cover defines a leading pole and another of them defines a leading groove corresponding to the leading pole. The leading pole slides in the leading groove and is selectively retained in at least two places.

Other advantages and novel features will become more apparent from the following detailed description when taken in conjunction with the accompanying drawings.

BRIEF DESCRIPTION OF THE DRAWINGS

Many aspects of the present mobile phone can be better understood with reference to the following drawings. The components in the various drawings are not necessarily drawn to scale, the emphasis instead being placed upon clearly illustrating the principles of the present mobile phone. Moreover, in the drawings, like reference numerals designate corresponding parts throughout the diagrams.

DETAILED DESCRIPTION OF THE INVENTION

Figure 1:
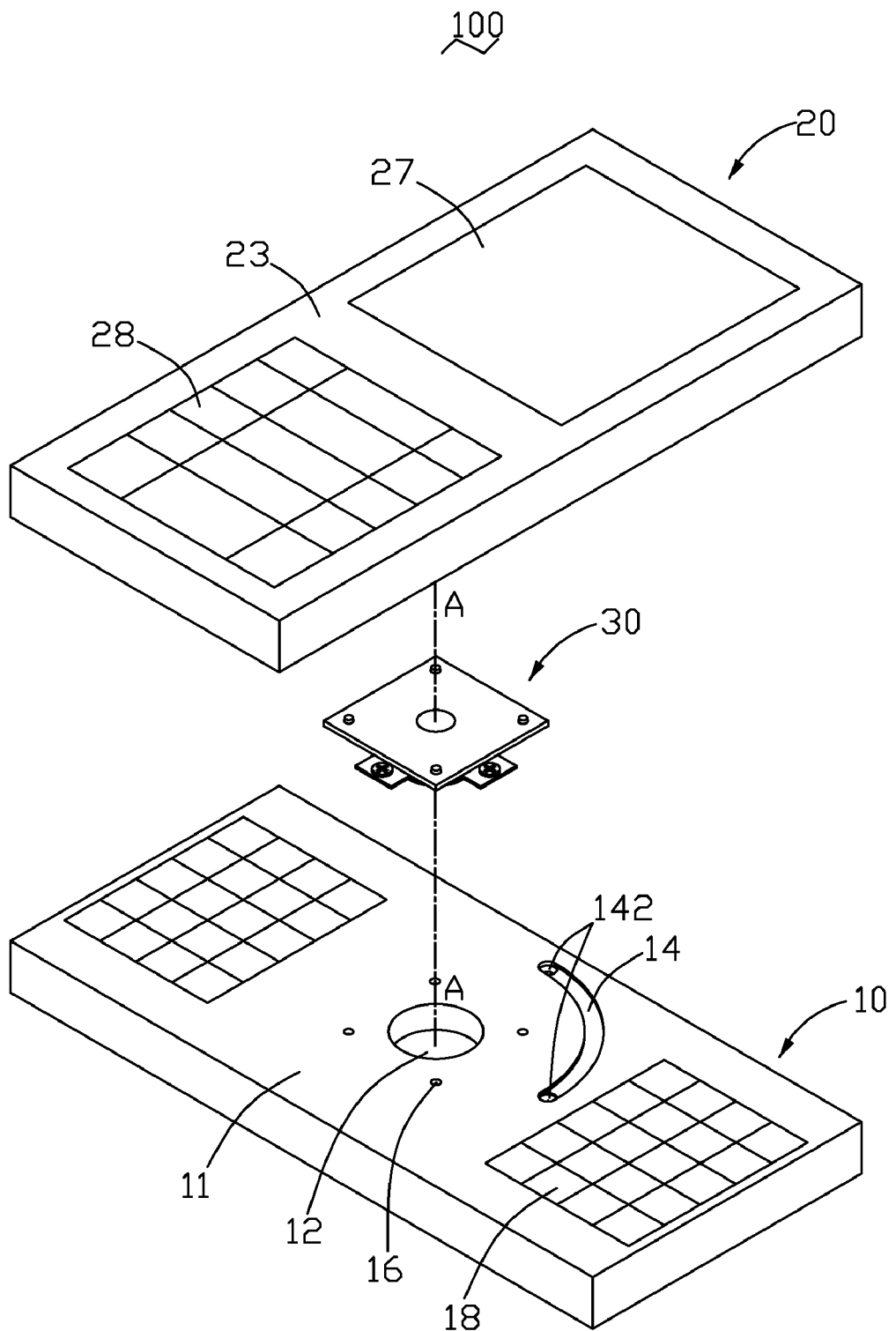
FIG. 1 is a partly exploded schematic view of the mobile phone, in accordance with a present embodiment.

Referring to the drawings in detail, FIG. 1 shows a mobile phone 100 in accordance with a present embodiment. The mobile phone 100 includes a base 10, a cover 20 rotatably mounted on the base 10 and a connecting apparatus 30 connecting the cover 20 to the base 10 and configured to cooperatively function with the cover 20 and the base thereby causing the cover 20 to be rotatable with respect to the base 10.

The base 10 includes a first connecting surface 11 and defines a central hole 12, a leading groove 14 and a plurality of first thread holes 16 therein. The central hole 12, the leading groove 14 and the first thread holes 16 all open on the first connecting surface 11. The leading groove 14 is an arc partly surrounding the central hole 12 and having a central angle of approximately 90 degrees, and a cross section of the leading groove 14 is shaped as semicircle. The base 10 also defines two retaining recesses 142 therein. Each retaining recess 142 is configured to have a hemispherical bottom and is deeper than the leading groove 14. The two retaining recesses 142 respectively communicate to one end of the leading groove 14. The first thread holes 16 are equidistantly defined around the central hole 12. Two first keypads 18 are respectively mounted on two ends of the first connecting surface 11, thus, the central hole 12, the leading groove 14 and the first thread holes 16 are all defined between the two first keypads 18.

Figure 2:
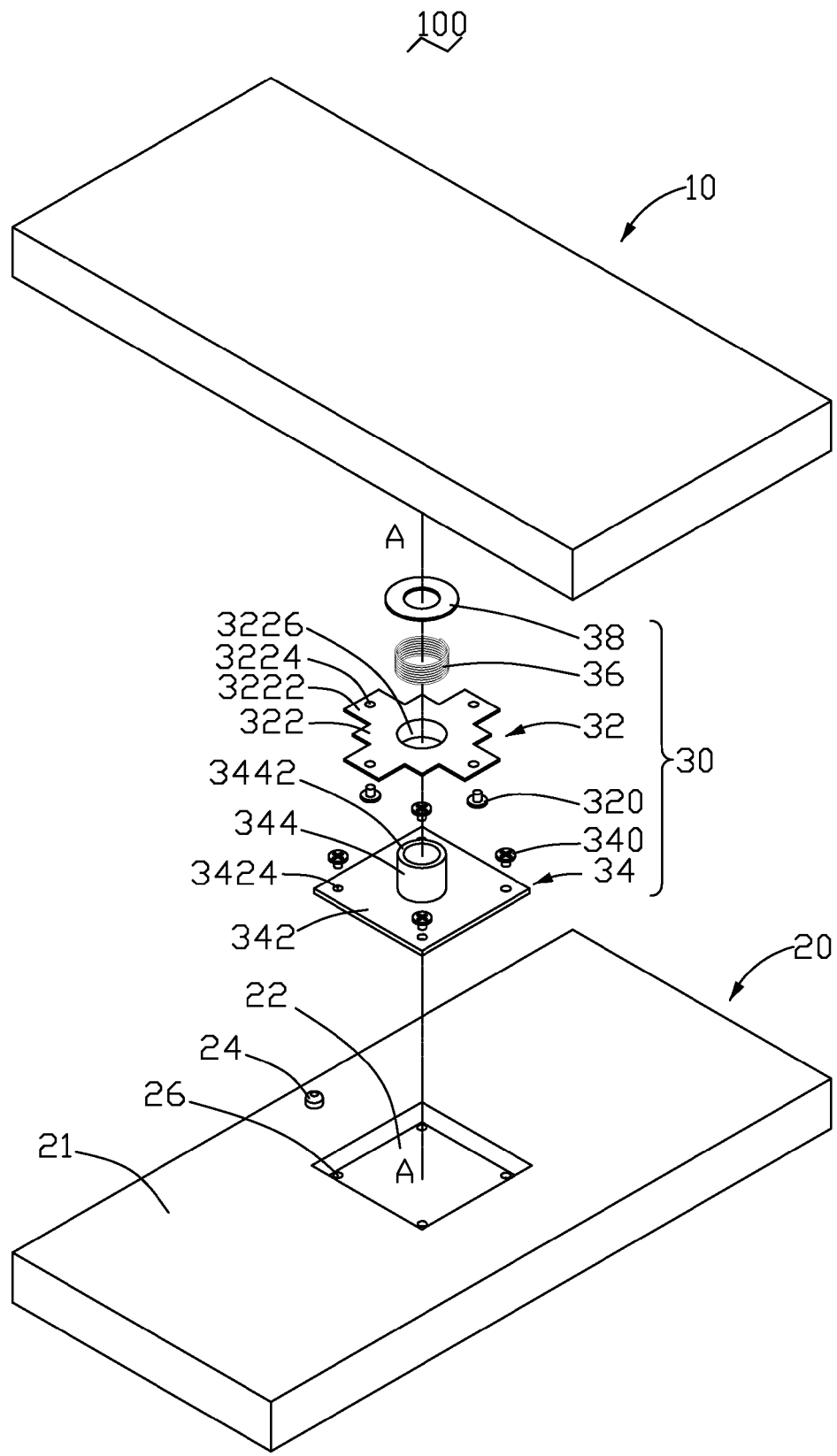
FIG. 2 is a disassembled view from a first aspect of the mobile phone shown in FIG. 1.
Figure 3:
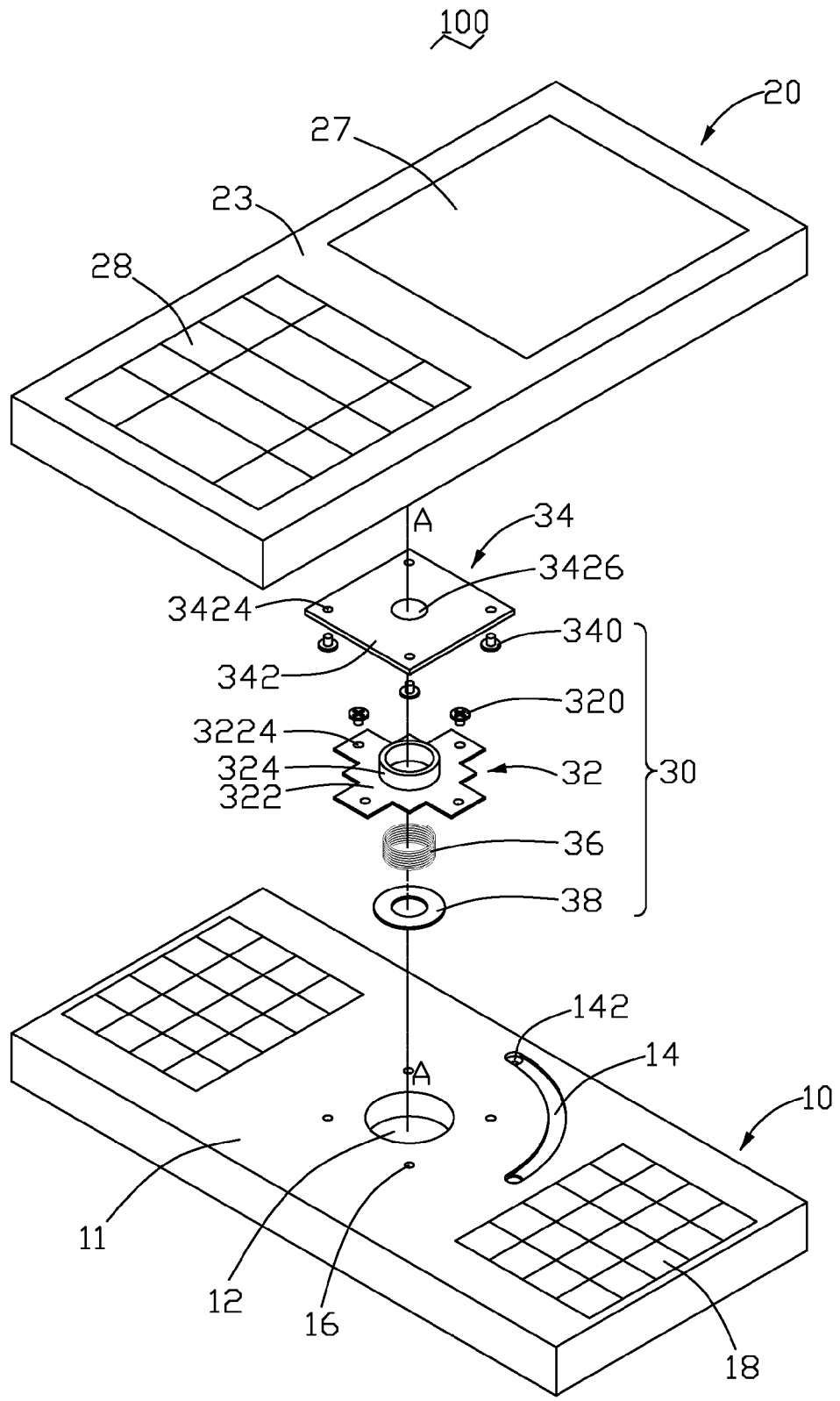
FIG. 3 is a disassembled view from a second aspect of the mobile phone shown in FIG. 1.

Also referring to FIG. 2 and FIG. 3, the cover 20 includes a second connecting surface 21 and an operating surface 23 at an opposite side of the connecting surface 21. The cover 20 defines a recess 22 in a central portion thereof. The recess 22 defines at a bottom surface thereof a plurality of second thread holes 26 corresponding to the first thread holes 16. A leading pole 24 is mounted on the second connecting surface 21 and adjacent to the recess 22. The end of the leading pole 24 is shaped as hemisphere, which corresponds to the bottom of each retaining recess 142. The leading pole 24 is engaged in the leading groove 14 and the retaining recesses 142. The length of the leading pole 24 is equal to a depth of the retaining recess 142. A display unit 27 and a second keypad 28 are mounted on the operating surface 23.

The connecting apparatus 30 includes a base connecting unit 32, a cover connecting unit 34, a resilient unit 36, a block unit 38, a plurality of first screws 320 and a plurality of second screws 340. Particularly referring to FIG. 3, the base connecting unit 32 includes a first connecting board 322 and a first connecting pipe 324. The first connecting board 322 is approximately a cross-shaped plate, and an extending portion 3222 is formed on a middle portion of each side of the first connecting board 322. A first assembling hole 3224 is defined in each extending portion 3222. A first connecting hole 3226 is defined in a central portion of the first connecting board 322. The first connecting pipe 324 is a hollow cylinder, a length of the first connecting pipe 324 is approximately equal to a depth of the recess 22, and one end of the first connecting pipe 324 is connected perpendicularly to a central portion of the first connecting board 322. The first connecting hole 3226 is surrounded by the sidewall of the first connecting pipe 324.

The cover connecting unit 34 includes a second connecting board 342 and a second connecting pipe 344. The second connecting board 342 is an approximately rectangular board, and a width of the second connecting board 342 is equal to that of the recess 22. Thus, the second connecting board 342 can be received in the recess 22. The second connecting board 342 defines a second assembling hole 3424 in each corner portion thereof. The second connecting board 342 also defines a second connecting hole 3426 in its central portion, and a diameter of the second connecting hole 3426 is less than that of the first connecting hole 3226. The second connecting pipe 344 is a hollow cylinder, and one end of the second connecting pipe 344 is connected perpendicularly to a central portion of the second connecting board 342. A length of the second connecting pipe 344 is larger than that of the first connecting pipe 324, and an outer diameter of the second connecting pipe 344 is less than an inner diameter of the first connecting pipe 324. Thus, the second connecting pipe 344 can be inserted into the first connecting pipe 324, and an extending end 3442 of the second connecting pipe 344 can extend from the first connecting pipe 324. The second connecting hole 3426 is surrounded by the sidewall of the second connecting pipe 344.

The resilient unit 36 is a coiled spring, and an inner diameter of the resilient unit 36 is larger than an outer diameter of the second connecting pipe 344. The block unit 38 is an annular board, an inner diameter of the block unit 38 is larger than an outer diameter of the second connecting pipe 344 but less than an outer diameter of the resilient unit 36. An outer diameter of the block unit 38 is less than an inner diameter of the central hole 12, thus the extending end 3442, the resilient unit 36 and the block unit 38 can all be received in the central hole 12.

Figure 4:
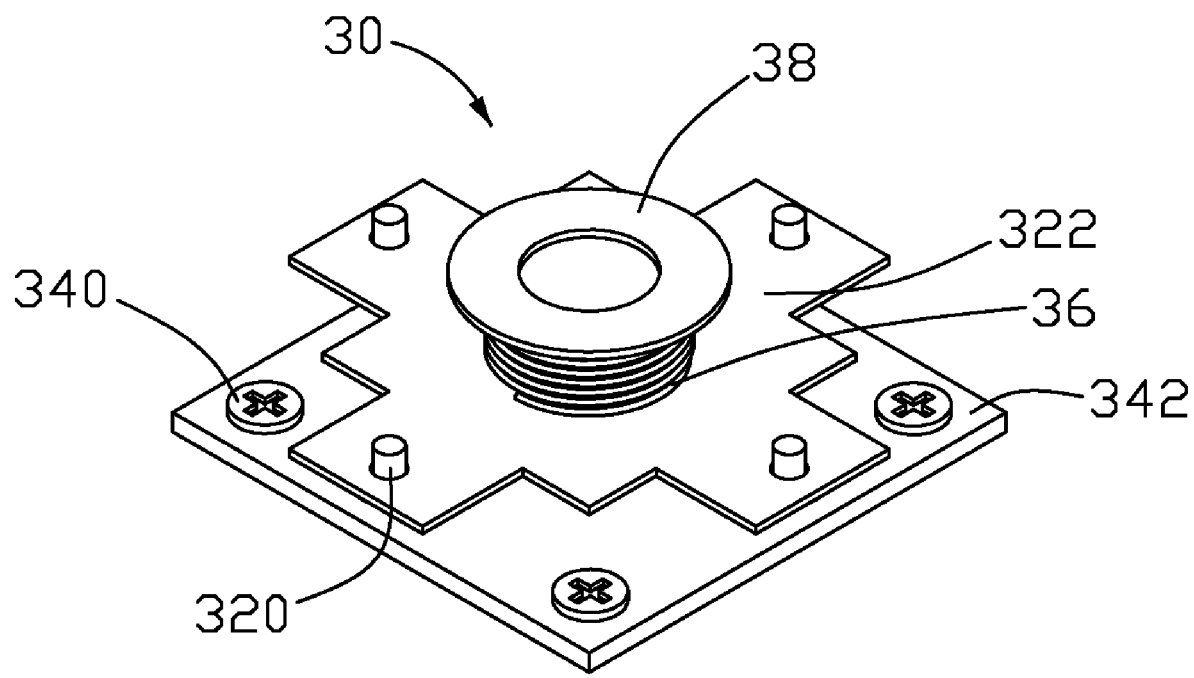
FIG. 4 is an assembled view of a connecting apparatus of the mobile phone shown in FIG. 1.

Also referring to FIG. 4, in assembly, the second connecting pipe 344 is inserted into the first connecting pipe 324. The first connecting pipe 324 is mounted between the first connecting board 322 and the second connecting board 342. One end of the first connecting pipe 324 keeps in tight contact with the second connecting board 342, and the extending end 3442 of the second connecting pipe 344 runs through the first connecting pipe 324 and extends out from the first connecting hole 3226. The resilient unit 36 is then coiled around a part of the second connecting pipe 344 which extends from the extending end 3442, and the block unit 38 is mounted on the extending end 3442 to press and block the resilient unit 36 between the block unit 38 and the first connecting board 322. The block unit 38 is mounted perpendicularly to the second connecting pipe 344 and via soldering, gluing or screwing. When the resilient unit 36 resiles towards the extending end 3442, it is blocked by the block unit 38 and can only resile towards the first connecting board 322. In this way, the base connecting unit 32 is mounted to the cover connecting unit 34.

The extending end 3442, the resilient unit 36 and the block unit 38 are received in the central hole 12 of the base 10. The first screws 320 are first inserted through the first assembling holes 3224, and then screwed into the first thread holes 16, thus the base connecting unit 32 is mounted to the base 10. One end of the leading pole 24 is engaged with a retaining recess 142 so that the cover 20 covers the base 10, thus the first keypads 18 are covered and protected. The cover connecting board 342 and the base connecting unit 32 are both received in the recess 22 of the cover 20. The second screws 340 are first inserted through the second assembling hole 3424, and then screwed into the second thread holes 26, thus the cover connecting unit 34 is mounted to the cover 20. In this way, the cover 20 is mounted on the base 10. A wire (not shown) can be mounted in the second connecting pipe 344 to electronically connect the base 10 to the cover 20.

Figure 5:
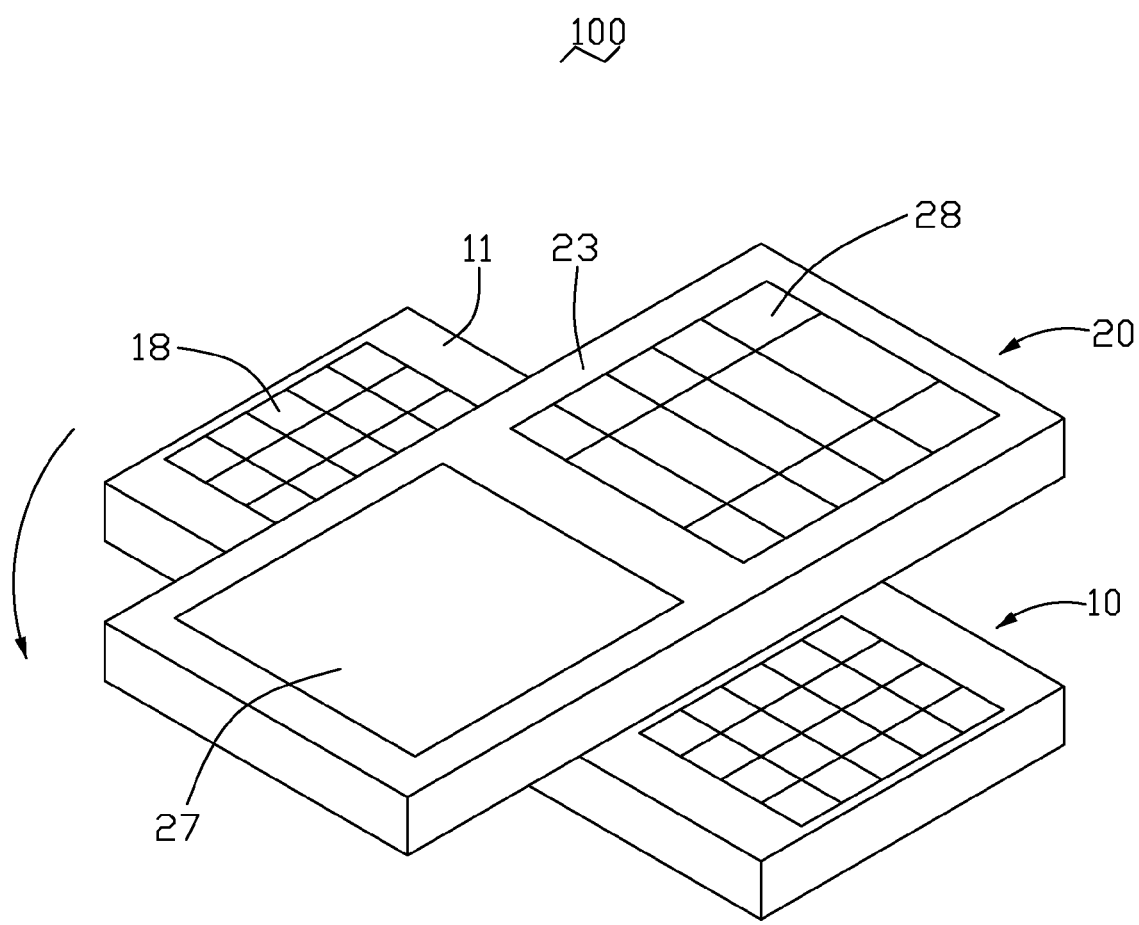
FIG. 5 is an assembled view of the opened mobile phone shown in FIG. 1.

Also referring to FIG. 5, when the mobile phone 100 is used to play games, the cover 20 is rotated along the leading groove 14. The leading pole 24 engaging with a retaining recess 142 moves out from the retaining recess 142 and slides in the leading groove 14. Because a depth of the leading groove 14 is less than that of the retaining recess 142, when the leading pole 24 slides in the leading groove 14, the base 10 is pushed away from the cover 20 in a small distance by the leading pole 24, and the resilient unit 36 is pressed. When the leading pole 24 slides to an end of the leading groove 14, it engages with another retaining recess 142. The resilient unit 36 resiles to press the base 10 towards the cover 20, and the base 10 is retained to be in contact and perpendicular to the cover 20. In this way, the base 10 and the cover 20 form a cross, the first keypads 18 exposes on two sides of the display 27 of the cover 20, which allows users to play games conveniently with two hands via the first keypads 18.

Figure 6:
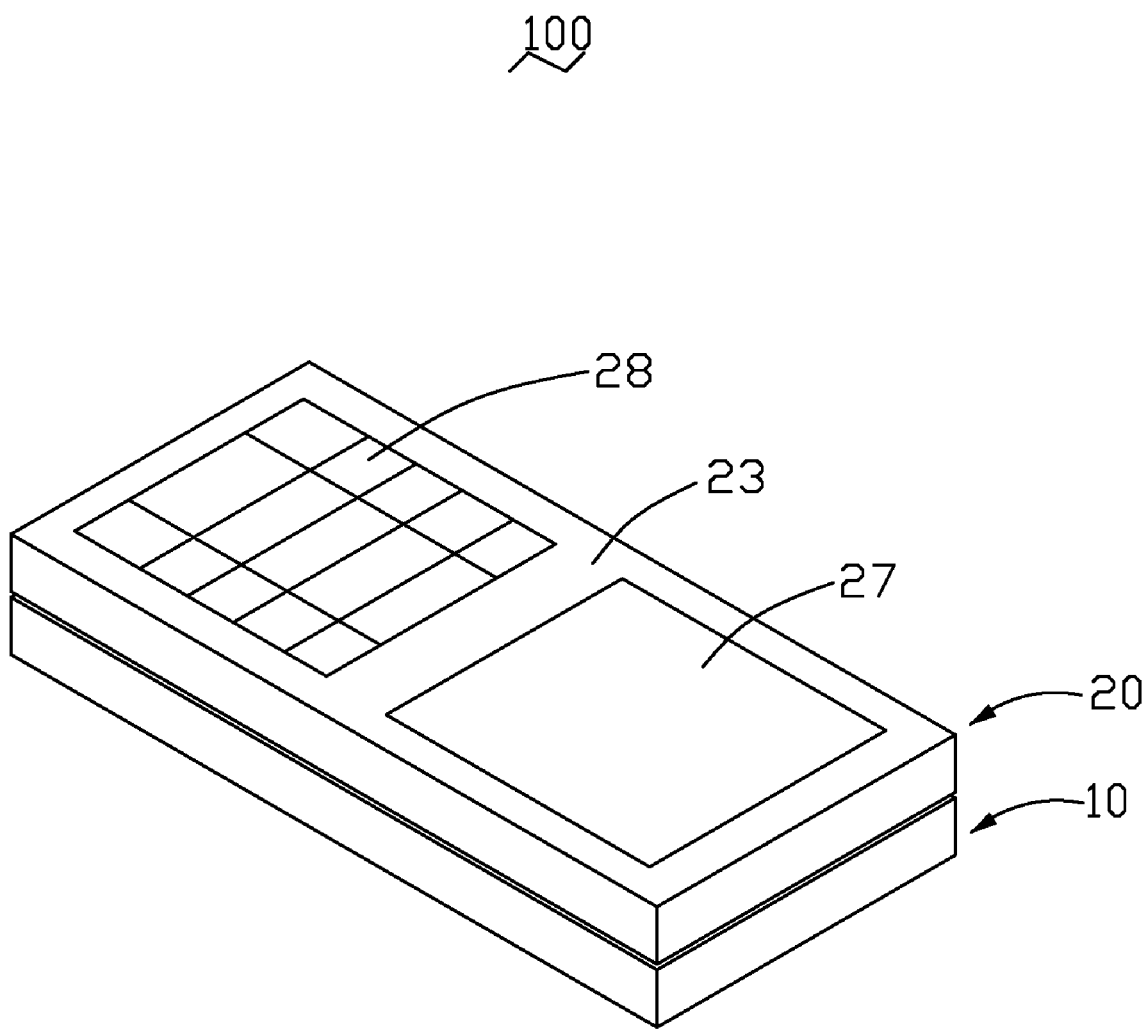
FIG. 6 is an assembled view of the closed mobile phone shown in FIG. 1.

Also referring to FIG. 6, when the mobile phone 100 is used to communicate, the cover 20 perpendicular to the base 10 is rotated along the leading pole 24. The leading pole 24 moves out of the current retaining recess 142 and slides to the initial retaining recess 142, thus the cover 20 returns to its original position covering the base 10. In this way, the first keypads 18 are covered, and users can operate the mobile phone via the display 27 and the second keypad 28.

This mobile phone 100 can be conveniently transformed into two shapes respectively configured for communication and playing games. Understandably, the leading pole 24 can be formed on the first connecting surface 11 of the base 10, and the leading groove 14 corresponding to the leading pole 24 can be defined in the cover 20. A central angle of the leading groove 14 can be configured for more than 90 degrees, and more than two retaining recesses 142 can be defined in the base 10 or the cover 20. The retaining recesses 142 are all defined in the sliding way of the leading pole 24, and communicate to the end or the middle portion of the leading groove 14. In this way, the leading pole 24 can be retained in different places, thus the mobile phone 100 can be transformed into at least two shapes for different purposes. When the mobile phone 100 is used to play games, the two second keypads 28 are positioned at both sides of the display 27, thus the user can conveniently play games with two hands. Additionally, the base connecting unit 32 and the cover connecting unit 34 can replace each other. The block unit 38 can also be omitted.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A mobile phone, comprising:
   a base; and
   a cover rotatably mounted on the base, either of the base and the cover defining a leading pole and the other of the base and the cover defining a leading groove corresponding to the leading pole; the leading pole sliding in the leading groove and being selectively retained in at least two places; and
   a connecting apparatus connecting the cover to the base and including a base connecting unit and a cover connecting unit; the base connecting unit mounted to the cover connecting unit, the base connecting unit mounted on the base, and the cover connecting unit mounted on the cover; the base connecting unit including a first connecting board and a first connecting pipe, the first connecting board mounted on the base, one end of the first connecting pipe perpendicularly connected to the first connecting board.

2. The mobile phone as claimed in claim 1, wherein the cover connecting unit includes a second connecting board and a second connecting pipe, the second connecting board being mounted on the cover, one end of the second connecting pipe being perpendicularly connected to the second connecting board.

3. The mobile phone as claimed in claim 2, wherein the second connecting pipe is inserted into the first connecting pipe, the first connecting pipe being mounted between the first connecting board and the second connecting board, and an extending end of the second connecting pipe extending from the first connecting pipe.

4. The mobile phone as claimed in claim 3, wherein the connecting apparatus includes a resilient unit, the resilient unit being a coiled spring coiled around the second connecting pipe.

5. The mobile phone as claimed in claim 4, wherein the connecting apparatus includes a block unit, the block unit being mounted on the extending end to press and block the resilient unit between the block unit and the first connecting board.

6. The mobile phone as claimed in claim 1, wherein the base includes a first connecting surface and defines a central hole therein, the central hole being defined in the first connecting surface, the connecting apparatus being partly received in the central hole.

7. The mobile phone as claimed in claim 1, wherein the cover includes a second connecting surface and defines a recess therein, the recess being defined in the second connecting surface, the connecting apparatus being partly received in the recess.

8. The mobile phone as claimed in claim 1, wherein the leading groove is an arcuate groove defined in the base, and the leading groove has a central angle of 90 degrees.

9. The mobile phone as claimed in claim 8, wherein the base defines at least two retaining recesses therein, the retaining recesses all communicating to the leading groove; the leading pole engaging with the retaining recesses.

10. The mobile phone as claimed in claim 9, wherein a length of the leading pole is equal to a depth of the retaining recess, and larger than a depth of the leading groove.

11. The mobile phone as claimed in claim 1, wherein the base includes two first keypads, and the cover includes a display and a second keypad.

12. A mobile phone, comprising:
a base including two first keypads; and
a cover rotatably mounted on the base and being selectively retained in at least two places; the cover including a display, the first keypads being covered when the cover is retained in one place and exposing on two sides of the display when the cover is retained in another place; wherein the cover defines a leading pole and the base defines a leading groove and at least two retaining recesses corresponding to the leading pole; all the retaining recesses communicating with the leading groove, the leading pole slides in the leading groove and engages with any one of the retaining recesses to be retained in at least two places.

13. The mobile phone as claimed in claim 12, wherein the leading groove is an arcuate groove, and the leading groove has a central angle of 90 degrees.

14. The mobile phone as claimed in claim 12, wherein a length of the leading pole is equal to a depth of the retaining recess, and larger than a depth of the leading groove.

* * * * *